United States Patent [19]
Ishii et al.

[11] Patent Number: 6,103,365
[45] Date of Patent: Aug. 15, 2000

[54] MAGNETIC TAPE

[75] Inventors: Takashi Ishii; Mitsuhiro Katashima, both of Tochigi-ken, Japan

[73] Assignee: Kao Corporation, Tokyo, Japan

[21] Appl. No.: 09/176,722

[22] Filed: Oct. 21, 1998

[30] Foreign Application Priority Data

Oct. 22, 1997 [JP] Japan ................................. 9-290166

[51] Int. Cl.⁷ ...................................................... G11B 5/66
[52] U.S. Cl. ........................... 428/332; 427/130; 427/131; 427/555; 428/402; 428/694 BB; 428/694 BR; 428/694 BA; 428/694 BH; 428/900

[58] Field of Search .................................. 427/555, 131, 427/130; 428/332, 402, 694 BB, 694 BR, 694 BA, 694 BH, 900

*Primary Examiner*—Bernard Pianalto
*Attorney, Agent, or Firm*—Oblon, Spivak, McClelland, Maier & Neustadt, P.C.

[57] ABSTRACT

A magnetic tape having formed on its backcoating layer 5 a recess 10 of prescribed shape capable of yielding an optical contrast to provide optical information with which servo tracking of data tracks on the magnetic layer is effected, the recess having a depth of 0.05 to 1 μm and a width of 0.25 to 30 μm, and the backcoating layer 5 having an arithmetic mean roughness Ra of 4 to 20 nm.

7 Claims, 4 Drawing Sheets

MAGNETIC TAPE

BACKGROUND OF THE INVENTION

1. Field of the Invention

The present invention relates to a magnetic tape having an optical servo track. More particularly, the present invention relates to a magnetic tape having an optical servo track on the side opposite to the magnetic recording side.

2. Description of the Related Art

The recent expanding scale of the computer network and the importance of security for data management have been increasing the demand for a magnetic tape having an increased recording capacity for use as a medium for data backup. Approaches to high recording capacity are divided into improvement on recording density and extension of the tape length.

Since the tape length is limited by the capacity of a tape cartridge in which a roll of tape is put, extension of the tape length cannot be achieved but by reducing the tape thickness. Therefore, an increase in recording capacity attained by this approach is of necessity limited. With respect to the recording density, it is known that a magnetic tape has a lower recording density than a hard disk drive. A magnetic tape having serpentine track scanning particularly has a low recording density, which is due to the low track density. On the other hand a magnetic tape having helical track scanning, which uses a servo tracking system called ATF (automatic track finding), possesses a higher track density than the magnetic tape having serpentine track scanning.

Servo tracking systems have also been adopted to the magnetic tape having serpentine track scanning to improve the track density. Such servo tracking systems include an embedded servo system, in which servo signals are written on the same track as the data track on the magnetic recording side, and a system in which a track exclusive to servo signals is provided on the magnetic recording side. Japanese Patent Publication No. 82626/95 discloses a servo tracking system particularly useful where the pitch of data tracks is as small as several tens of microns, in which dedicated tracks for servo signals are provided on the magnetic recording side and a plurality of servo signal read heads are used for reading the servo signals. According to this technique, however, the number of servo signal read heads must be increased as the number of data tracks increases. Otherwise, the number of servo tracks should be increased. Like this, conventional servo tracking systems use the same side of magnetic recording as used for data recording, which means that the data recording area is reduced accordingly. This disadvantage is conspicuous in the servo tracking system of Japanese Patent Publn. No. 82626/95 when a track density is as high as about 30 tpmm (tracks per mm) or even more.

SUMMARY OF THE INVENTION

Accordingly, an object of the present invention is to provide a magnetic tape in which servo tracking can be carried out without lessening the data recording area.

Another object of the present invention is to provide a magnetic tape having increased track density.

Still another object of the present invention is to provide a magnetic tape having high recording capacity.

The inventors of the present invention found that servo tracking can be carried out without diminishing the data area of a magnetic layer by providing a servo track on the backcoating layer of a magnetic tape, which turned out to accompany new problems in terms of various characteristics of the magnetic tape. As a result of further investigation, the inventors have found that the problems associated with a servo track formed on the backcoating layer can be solved to provide a magnetic tape accomplishing the above objects by forming an optical servo track having specific dimensions and defining the surface roughness of the backcoating layer within a specific range.

Completed based on the above finding, the present invention provides a magnetic tape comprising a substrate having a magnetic layer on one side thereof and a backcoating layer on the other side, wherein the backcoating layer has on the surface thereof a recess of prescribed shape capable of yielding an optical contrast to provide optical information with which servo tracking of the data track on the magnetic layer is affected, the recess has a depth of 0.05 to 1 $\mu$m and a width of 0.25 to 30 $\mu$m, and the backcoating layer has an arithmetic mean roughness Ra of 4 to 20 nm.

According to the present invention, a magnetic tape which furnishes servo information without impairing the essential functions of the backcoating layer can be provided.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 3(*a*) is a cross section of FIG. 2 taken along line I—I, and FIG. 3(*b*) is an expanded partial view of FIG. 3(*a*);

FIG. 4(*a*), FIG. 4(*b*), FIG. 4(*c*) and FIG. 4(*d*) schematically illustrate a method for achieving servo tracking by a push-pull method;

DETAILED DESCRIPTION OF THE PREFERRED EMBODIMENTS

Figure 1:
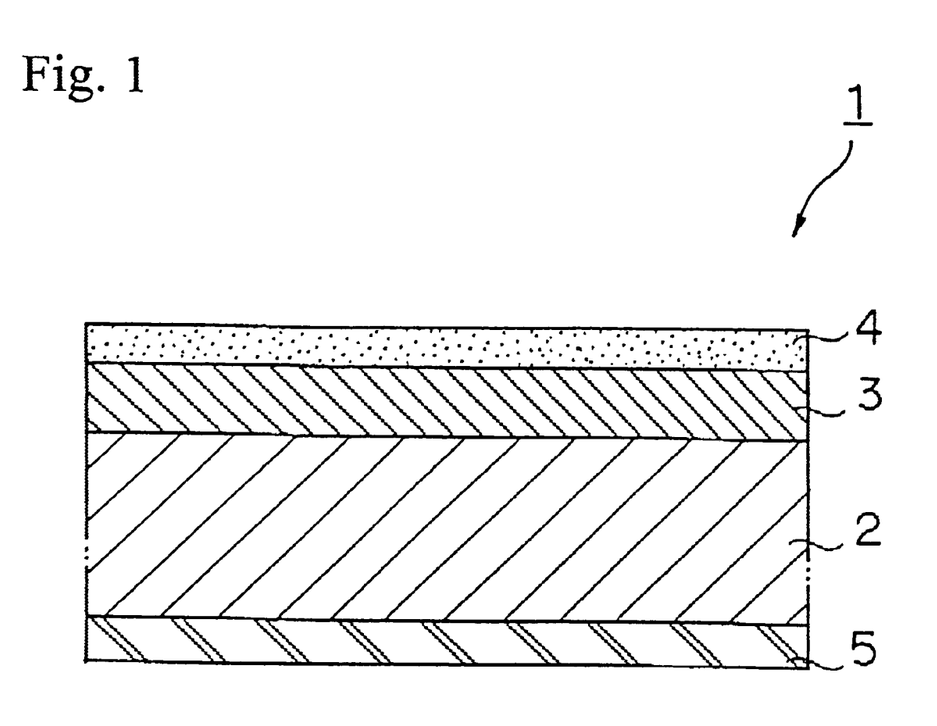
FIG. 1 is a schematic view showing the structure of an embodiment of the magnetic tape according to the present invention.
Figure 2:
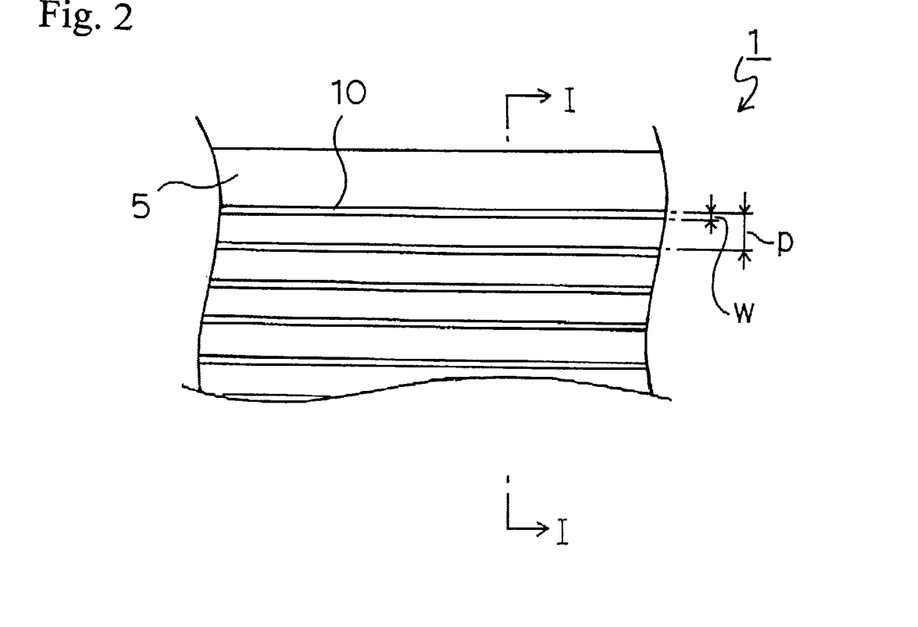
FIG. 2 is an expanded partial plan view of the backcoating layer of FIG. 1.

The magnetic tape of the present invention will be described in detail with reference to the preferred embodiments thereof depicted in the accompanying drawings, in which FIG. 1 is a schematic view showing the structure of an embodiment of the magnetic tape according to the present invention, FIG. 2 is an expanded partial plan view of the backcoating layer of FIG. 1, FIG. 3(*a*) is a cross section of FIG. 2 taken along line I—I, and FIG. 3(*b*) is an expanded partial view of FIG. 3(*a*).

A magnetic tape 1 shown in FIG. 1 comprises a substrate 2 having provided thereon an intermediate layer 3 and a magnetic layer 4 as a top layer overlying the intermediate layer 3. The substrate 2 has on the other side a backcoating layer 5.

The magnetic tape 1 shown in FIG. 1 is for a recording system having serpentine track scanning. The magnetic layer 4 has a plurality of data tracks in parallel with the running direction of the tape 1. Upon use of the magnetic tape 1, a head unit having a predetermined number of magnetic heads is moved across the magnetic tape 1, switching among data tracks, to record or reproduce data on the prescribed data track. In order to position each magnetic head on a proper data track when switching data tracks for recording or reproduction, servo tracking is carried out.

Figures 3A, 3B:
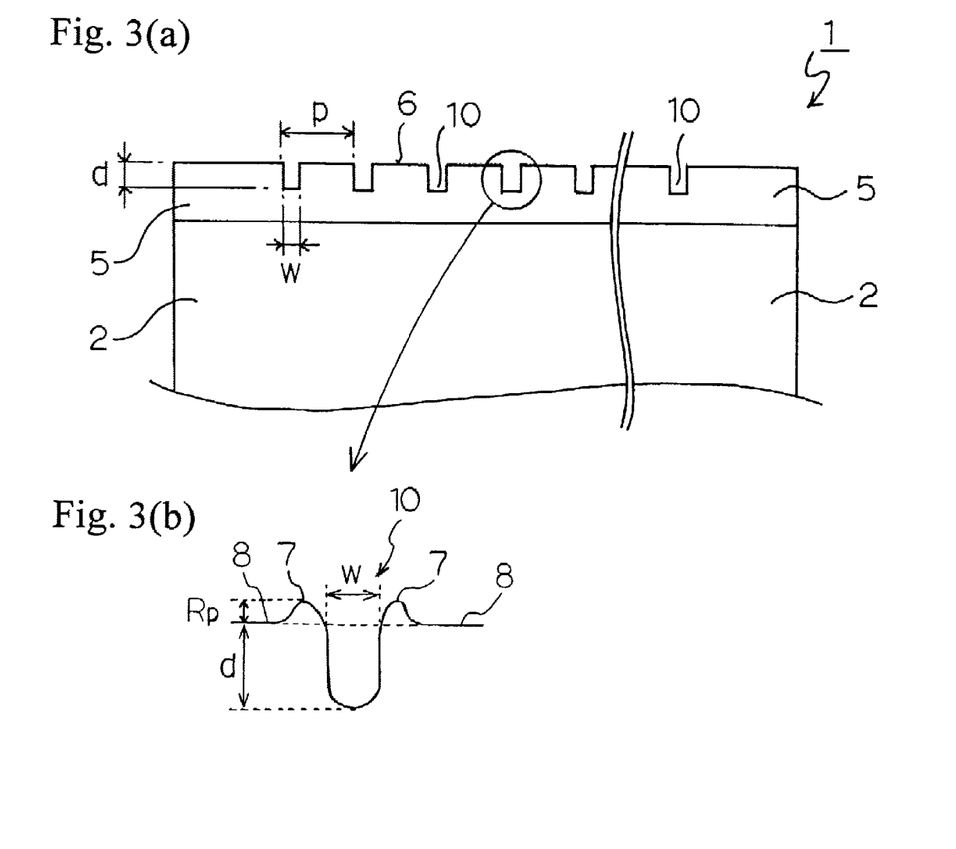

As shown in FIGS. 2 and 3(a), recesses comprising a plurality of grooves 10,10, . . . are formed on the surface of the backcoating layer 5 along the longitudinal direction of the magnetic tape 1. In this embodiment, the grooves 10 are continuous in parallel with the longitudinal direction of the magnetic tape 1 over approximately the whole length of the tape and spaced either equally or with regularly changed. The groove 10 is capable of yielding an optical contrast to provide optical information, with which servo tracking of the data tracks on the magnetic layer 4 can be effected. The cross section of each groove 10 is nearly rectangular with a dimension of a depth d and a width w. As stated previously, data tracks on the magnetic layer 4 are formed in parallel with the longitudinal direction of the magnetic tape 1 similarly to the grooves 10, but the relative positional relationship between the data tracks and the grooves 10 is not particularly limited.

The optical contrast can be yielded by, for example, irradiating the groove 10 with light of prescribed wavelength to produce a difference in intensity of reflected light.

Where the contrast of reflected light intensity is used for servo tracking, the intensity of reflected light is detected and processed by an optical servo mechanism, such as a push-pull method or a three-beam method, to carry out servo tracking. The optical servo mechanisms, such as a push-pull method and a three-beam method, are techniques commonly employed for achieving optical servo tracking in various optical disks.

Figure 4A:
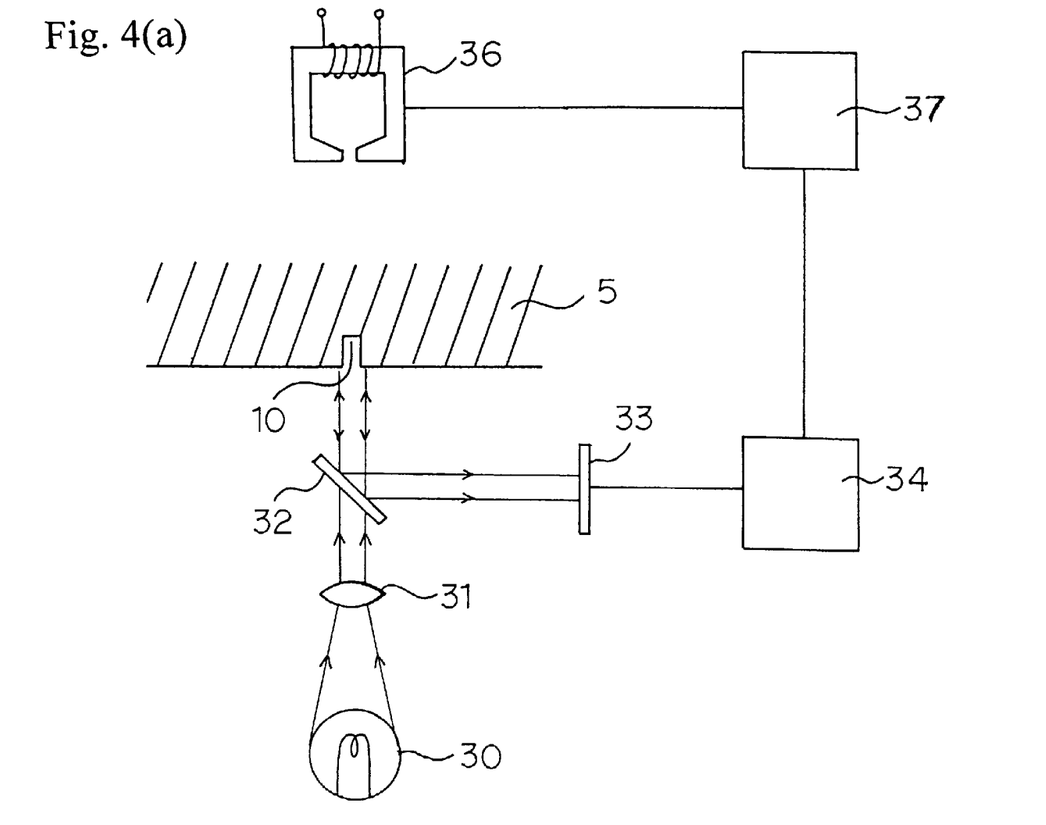
Figure 4B:
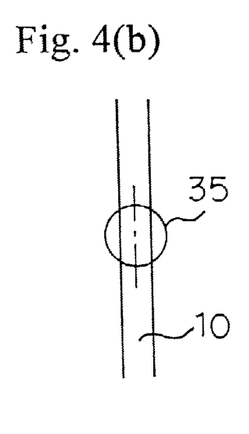
Figure 4C:
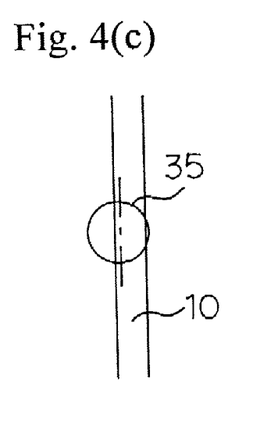
Figure 4D:
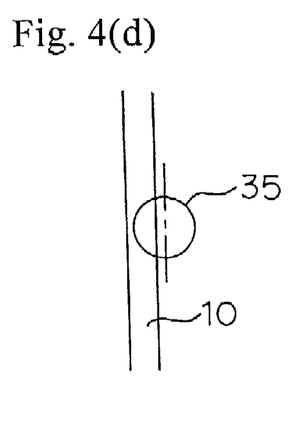

Servo tracking based on detecting reflected light intensity by a push-pull method is carried out as follows. In FIG. 4(a), a magnetic tape having the backcoating layer 5 runs in the direction perpendicular to the surface of the paper. Light is emitted from a light source 30, such as a laser diode, which is placed to face the backcoating layer 5, condensed through a lens 31 to a prescribed beam diameter, passes through a half mirror 32, and enters the groove 10 formed on the backcoating layer 5. The beam diameter is somewhat larger than the width of the groove 10. The light reflected on the groove 10 is reflected on the half mirror 32, turning its direction, and enters a light detector 33, where the intensity of the reflected light is detected. The detected reflected light intensity is converted to electrical signals and sent to a servo tracking processor 34, where the symmetry of the reflected light beam intensity is analyzed. If the beam intensity displays bilateral symmetry, it means that the center of the beam 35 is on the center line of the width of the groove 10 as shown in FIG. 4(b). This state is an "on-track" state, indicating that the magnetic head is properly positioned on an aimed data track of the magnetic layer 4. If the beam intensity lacks bilateral symmetry, it indicates that the beam 35 is deviating from the center line to either left or right as shown in FIGS. 4(c) and (d). This state is an "off-track" state, that is, the magnetic head is not properly positioned on the aimed data track of the magnetic layer. Then the servo tracking processor 34 gives a head actuator 37 of the magnetic head 36 instructions to move the magnetic head 36 to a proper position as shown in FIG. 4(a). As a result, the magnetic head 36 is properly positioned by the head actuator 37 to achieve an "on-track" state.

The following problems (1) and (2) accompany formation of recesses on the backcoating layer of a magnetic tape for servo tracking.

(1) When the magnetic tape is wound, the surface profile of the backcoating layer are transferred to the surface of the magnetic layer to impair the surface smoothness of the magnetic layer. The surface profile of the backcoating layer includes not only the recesses providing servo information but projections which may be formed at both lips of each recess. As a result, a depression is produced on the surface of the magnetic layer to cause a spacing loss of read process, which incurs a reduction in output and an increase in error rate in reading.

(2) The recess affects uniformity of the coefficient of friction of the backcoating layer to reduce the running stability of the magnetic tape.

In the present invention, the above problems can be eliminated by specifying the depth d and width w of the recess and also specifying the arithmetic mean roughness Ra of the backcoating layer 5, thereby providing a magnetic tape which can furnish servo information without reducing the data area. If formation of projections on both lips of each recess is inevitable, the above problems can be solved by not only specifying the dimensions of the recesses and the Ra of the backcoating layer but limiting the maximum height of the projections.

Referring to FIGS. 2 and 3(a) which depict a depth d and a width w of the recess, the groove 10 which is one embodiment of the recess has a depth d of 0.05 to 1 $\mu$m. If the depth d is less than 0.05 $\mu$m, a sufficient phase difference for causing interference of reflected light is not made, or the incident light is not sufficiently scattered, failing to yield an optical contrast. If the depth d exceeds 1 $\mu$m, the shape of the groove 10 is appreciably transferred physically to the magnetic layer 4 under its wound state to deteriorate the flatness and smoothness of the magnetic tape. A preferred range of the depth d of the groove 10 is from 0.05 to 0.5 $\mu$m. It is preferred for the groove 10 not to have a depth exceeding the thickness of the backcoating layer 5. If the depth should be greater than the thickness of the backcoating layer 5, the bottom of the groove reaches the substrate 2 to reduce the stiffness of the substrate 2. The term "width" as used for a groove 10 means the length in the width direction of the magnetic tape 1.

The groove 10 has a width w of 0.25 to 30 $\mu$m. If the width w is smaller than 0.25 $\mu$m, a sufficient optical contrast cannot be yielded because it is difficult to condense the beam to such a small diameter with the state-of-the-art technique. If the width w exceeds 30 $\mu$m, the shape of the groove 10 is appreciably transferred physically to the magnetic layer 4 under its wound state to deteriorate the flatness and smoothness of the magnetic tape. A preferred width w of the groove 10 is 0.25 to 10 $\mu$m, particularly 0.5 to 6 $\mu$m.

It is preferred that the pitch p of the grooves 10, 10 in the same servo zone be not less than the width w of the groove 10 and be not more than 150 $\mu$m. If the pitch p is less than the width w of the groove 10, the optical contrast may tend to be insufficient, or the servo information from a groove may be affected by the adjacent groove, resulting in a failure of accurate tracking. A pitch p exceeding 150 $\mu$m makes it difficult to improve the track density of the magnetic layer 4.

The grooves 10 may be arranged over the whole width of the magnetic tape 1 at prescribed intervals as illustrated in FIG. 2, or a group of grooves spaced at prescribed intervals may be localized in, for example, the central portion or either one of side portions of the tape in the width direction.

Two or more groups of the grooves 10 spaced at prescribed intervals may be localized in two or more positions of the tape in the width direction. For example, one or more groups of the grooves, which may consist of the same or different number of the grooves, can be arranged on each side portion of the tape, one or more groups of the grooves, which may consist of the same or different number of the grooves, can be arranged on the central portion and one of the side portions of the tape, or one or more groups of the grooves, which may consist of the same or different number of grooves, can be arranged on the central portion and each side portion of the tape. In any case, the total number of the grooves is preferably a measure of the number of the data tracks on the magnetic layer 4.

As shown in FIG. 3(b), formation of the groove 10 is sometimes accompanied by formation of small projections 7, 7 at the lips of the groove in the longitudinal direction of the groove. If the height of the projections 7 is outstanding, the profile of the projections will be transferred onto the surface of the magnetic layer 4 when the magnetic tape 1 is wound, which may ruin the smoothness of the magnetic layer 4. The inventors' close investigation has revealed that a deep recess which causes errors would be formed on the magnetic layer 4 if the maximum height Rk of the projections 7 exceeds 0.25 µm measured with an atomic force microscope (AFM) as described below. Rp is preferably as small as possible. It is the most desirable that there be no projections 7. The "longitudinal direction" of the groove 10 agrees with the longitudinal direction of the magnetic tape 1.

The maximum height Rp of the projections is measured under an AFM. By use of Nanoscope manufactured by Digital Instrument Co., an AFM image of a 50 µm×50 µm square area on the surface of the backcoating layer 5 is taken, and the height data are flattened by the flatten command of off-line modify. The cursor is moved on the image to indicate two positions for taking a cross section, and the cross section of the groove 10 is measured by Section Analysis under off-line analyze. As shown in FIG. 3(b), Rp is the maximum height above the base plane (root mean square plane) 8. For height correction before measurement, grid pitch 3 µm of the standard sample for STS-1000 manufactured by VLSI Standards Incorporated, CA, U.S.A. was used. The depth of recesses formed on the surface of the magnetic layer 4 as referred to in Examples hereinafter described was measured in the same manner.

The Rp of the projections 7 is measured by setting one of the markers displayed on the profile obtained by an AFM at the maximum height of the projections 7, and the other marker on the base plane 8, which is the least square plane over the total assessment area.

In cases where projections 7 are formed on both lips of a groove 10 along its longitudinal direction, the depth d of the groove 10 is defined as a distance from the base plane 8 to the valley of the groove 10, and width w of a groove 10 is defined as the length of the base plane 8 crossing the groove 10, as shown in FIG. 3(b).

In addition to the aforesaid requirements of depth d and width w of the grooves 10, it is essentially required for the magnetic tape of the present invention to have an arithmetic mean roughness Ra of 4 to 20 nm on the surface 6 of its backcoating layer 5. If the Ra exceeds 20 nm, the surface profile of the backcoating layer 5 is physically transferred to the surface of the magnetic layer when the magnetic tape is under wound state, and the grooves 10 may not function as servo tracks. If the Ra is less than 4 nm, the backcoating layer 5 may be liable to stick to the magnetic layer 4. A preferred Ra range is from 4 to 15 nm, particularly from 4 to 10 nm. Means for controlling the Ra within the above range includes adjustment of the particle size of various particles to be contained in the backcoating layer 5, especially carbon black particles, and calendering of the backcoating layer 5.

The arithmetic mean roughness Ra is defined by equation (1) shown below and can be measured with Laser Interferometric Microscope Maxim 3 D Model 5700 manufactured by Zygo under the following conditions.

| Filter: | Fixed |
|---|---|
| Remove: | Cylinder |
| Filter Freg: | 4.0 (1/mm) |
| Filter Wavelength: | 0.250 (mm) |
| Trim: | 0 |
| Trim Move: | all |
| Lens: | Fizeau × 40 |

In measuring the surface roughness Ra, a sample is stuck to a slide glass for microscopes which satisfies the requirements specified in JIS-R-3502 (e.g., a slide glass produced by Matsunami Glass K.K., which was used in the present invention) with water or ethanol. Existence of excessive water or ethanol will ruin the reproducibility of measurements. Therefore measurement is made after the water or ethanol evaporates to some extent and while an interference fringe can be seen from the back side of the slide glass.

$$Ra = 1/l \int_0^l |Y(x)| dx \tag{1}$$

wherein Y represents profile data; and l represents an assessment length.

The backcoating layer 5 is made up of a binder, a lubricant, a hardener, carbon black, etc.

Any binder customarily employed in magnetic tape is usable with no limitation. For example, thermoplastic resins, thermosetting resins, reactive resins, and mixtures thereof can be used. Specific examples of useful binders include vinyl chloride copolymers or modified vinyl chloride copolymers, copolymers comprising acrylic acid, methacrylic acid or esters thereof, acrylonitrile copolymers (rubbery resins), polyester resins, polyurethane resins, epoxy resins, cellulosic resins, and polyamide resins. These binders preferably have a number average molecular weight of 2,000 to 200,000. In order to improve dispersing properties for particulate additives incorporated into the backcoating layer 5, the binder resin can have a polarizing functional group (so-called polar group), such as a hydroxyl group, a carboxyl group or a salt thereof, a sulfoxyl group or a salt thereof, a phospho group or a salt thereof, a nitro group, a nitric ester group, an acetyl group, a sulfuric ester group or a salt thereof, an epoxy group, a nitrile group, a carbonyl group, an amino group, an alkylamino group, an alkylammonium salt group, a sulfobetaine structure, a carbobetaine structure, and the like.

Generally useful lubricants include fatty acids and fatty acid esters. Examples of suitable fatty acid lubricants are caproic acid, caprylic acid, capric acid, lauric acid, myristic acid, palmitic acid, stearic acid, isostearic acid, linolenic acid, oleic acid, elaidic acid, behenic acid, malonic acid, succinic acid, maleic acid, glutaric acid, adipic acid, pimelic acid, azelaic acid, sebacic acid, 1,12-dodecanedicarboxylic acid, and octanedicarboxylic acid. Examples of suitable fatty acid ester lubricants are alkyl esters of the above-enumerated fatty acids, preferably those having 12 to 36 carbon atoms in total. The lubricants are preferably added in an amount of 0.5 to 20 parts by weight per 100 parts by weight of the binder.

The hardeners include isocyanate hardeners, exemplified by "Coronate L" (a trade name, produced by Nippon Polyurethane Industry Co., Ltd.) and amine hardeners.

The hardeners are preferably added in an amount of 10 to 80 parts by weight, particularly 15 to 30 parts by weight, especially 15 to 20 parts by weight, per 100 parts by weight of the binder.

For ease of Ra control, it is preferred to use carbon black having a primary particle size of 15 to 80 nm, particularly 17 to 40 nm. Such carbon black is preferably added in an amount of 50 to 150 parts by weight, particularly 50 to 120 parts by weight, per 100 parts by weight of the binder. Carbon black having the above particle size can be used in combination with 10 to 40 parts by weight, per 100 parts by weight of the binder, of carbon black having a primary particle size of 80 to 200 nm.

The backcoating layer 5 is formed by coating the substrate 2 with a backcoating composition having the above-mentioned components dispersed in a solvent. Examples of suitable solvents include ketones, esters, ethers, aromatic hydrocarbons, and chlorinated hydrocarbons. The solvent is preferably used in such an amount of 300 to 1500 parts by weight, particularly 400 to 1200 parts by weight, per 100 parts by weight of the binder.

The thickness of the backcoating layer 5, formed by applying the above-described backcoating composition, is preferably 0.1 to 0.8 $\mu$m, taking into consideration the depth of the grooves 10 and the thickness balance with the magnetic layer 4 and the intermediate layer 3.

The method for forming grooves 10 on the surface of the backcoating layer 5 is not particularly restricted, but methods suitable to fine patterning, such as laser-beam machining and embossing with an embossing roll, are preferred. Compared with embossing, laser-beam machining is advantageous in that fine pattern can be formed on the surface of the backcoating layer without giving influences to the surface of the magnetic layer 4.

Figure 5:
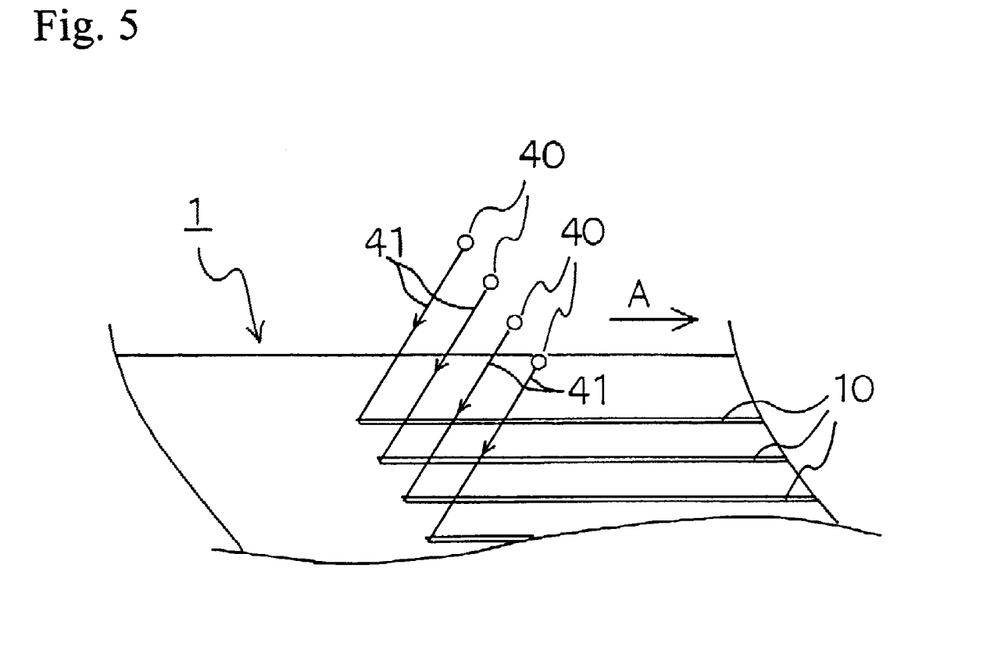
FIG. 5 schematically illustrates a method for forming grooves by laser-beam machining.

Laser-beam machining for forming the grooves 10 can be performed as follows. As shown in FIG. 5, a plurality of laser beams 41 are emitted in parallel from the respective laser light sources 40 aligned at prescribed intervals across the width direction of the magnetic tape 1 to illuminate the backcoating layer 5 running in direction A at a predetermined speed. The energy of the laser beams 41 form the grooves 10, 10, . . . on the backcoating layer 5. The depth d and width w of the grooves 10 thus formed can be controlled by adjusting the beam diameter and output power of the laser beams 41. The laser beam preferably has a diameter of 0.25 to 30 $\mu$m, particularly 0.25 to 25 $\mu$m, and an output power of 0.02 to 5 W/beam, particularly 0.02 to 1 W/beam. In order to avoid the formation of projections 7 on both longitudinal lips of each groove 10 or, in order to minimize the Rp if any projection is inevitably formed, it is preferred to irradiate with beams of high energy density in as short a time as possible, e.g., in 5 to 200 ns. In using beams of 1 $\mu$s or longer, the running speed of the tape should be adjusted so as not to form projections or to minimize the Rp of projections if any. While not shown, the position of either one of the edges of the running magnetic tape 1 is preferably regulated by some means to prevent running fluctuation so that the distance from that edge to each groove 10 may be constant. Note that the grooves 10 are depicted in FIG. 5 with exaggeration.

The backcoating layer 5 of the magnetic tape 1 according to the embodiment shown in FIGS. 2 and 3(a) has recesses which are a plurality of grooves 10 along the longitudinal direction of the magnetic tape 1. Such recesses can be replaced by a single straight groove along the longitudinal direction of the tape 1 or a single or a plurality of sine curves along the longitudinal direction of the tape 1. Further, the recesses can be comprised of discontinuous pieces of grooves 10 arranged along the longitudinal direction of the tape 1 as shown in FIG. 6.

Figure 6:
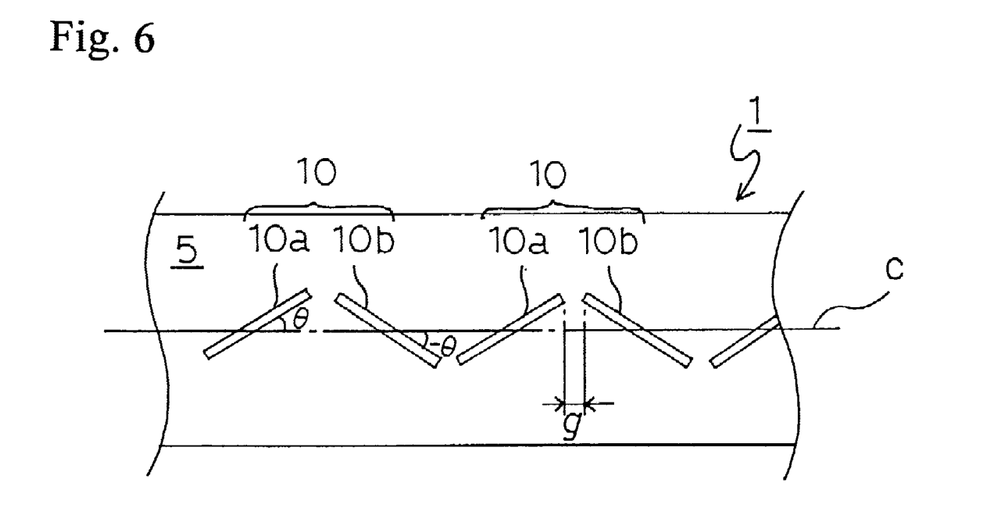
FIG. 6 shows another pattern of recesses (corresponding to FIG. 2).

The pattern of grooves 10 shown in FIG. 6 is made up of a repetition of pairs of a groove 10a angled at $\theta°$ with the longitudinal direction of the magnetic tape 1 and a groove 10b angled at $-\theta°$, the grooves 10a and 10b alternating with each other in the longitudinal direction of the tape 1, and each groove being symmetrical about the center line c along the longitudinal direction of the tape 1. The angle $\theta$ has an influence on the precision of positioning by servo tracking. A preferred angle $\theta$ for securing sufficient precision of positioning is 5 to 85°, particularly 10 to 30°. The lengths of the grooves 10a and the grooves 10b may the same or different, each preferably ranging from 5 to 140 mm, particularly 5 to 80 mm. The spacing g between the groove 10a and the groove 10b making each pair is preferably as narrow as possible, while being limited by the method of making the grooves. The servo tracking by the grooves 10 shown in FIG. 6 can be carried out in the same manner as for the grooves 10 shown in FIGS. 2 and 3(a).

General particulars concerning the magnetic tape according to the present invention are now described.

The magnetic layer 4 of the magnetic tape 1 shown in FIG. 1 is formed by applying a magnetic coating composition comprising ferromagnetic powder and a binder. Namely, the magnetic tape 1 is of coated type.

The ferromagnetic powder which can be used includes acicular or spindle-shaped ferromagnetic powder, or tabular ferromagnetic powder. Acicular or spindle-shaped ferromagnetic powder includes ferromagnetic metal powder comprising iron as major component and ferromagnetic iron oxide powder, and tabular ferromagnetic powder includes ferromagnetic hexagonal ferrite powder.

More specifically, the ferromagnetic metal powder includes powder having a metal content of not less than 50% by weight, 60% by weight or more of which is iron. Specific examples of such ferromagnetic metal powders includes Fe—Co, Fe—Ni, Fe—Al, Fe—Ni—Al, Fe—Co—Ni, Fe—Ni—Al—Zn, and Fe—Al—Si. The ferromagnetic iron oxide powder includes $\gamma$-Fe$_2$O$_3$, Co-doped $\gamma$-Fe$_2$O$_3$, and Co-doped FeOx (4/3$\leq$x<1.5). The acicular or spindle-shaped ferromagnetic powder preferably has a major axis length of 0.05 to 0.2 $\mu$m, particularly 0.05 to 0.16 $\mu$m, with an acicular ratio (major axis length/minor axis length) of 3 to 15, particularly 3 to 10. The acicular or spindle-shaped ferromagnetic powder preferably has a coercive force (Hc) of 125 to 280 kA/m, particularly 135 to 200 kA/m, and a saturation magnetization ($\sigma$s) of 110 to 170 Am$^2$/kg, particularly 120 to 150 Am$^2$/kg. The acicular or spindle-shaped ferromagnetic powder preferably has a BET specific surface area of 30 to 70 m$^2$/g, particularly 40 to 70 m$^2$/g.

The ferromagnetic hexagonal ferrite powder includes fine tabular particles of barium ferrite or strontium ferrite, part of the Fe atoms of which may be displaced with Ti, Co, Ni, Zn, V or the like atoms. The ferromagnetic hexagonal ferrite powder preferably has a tabular diameter of 0.1 $\mu$m or less, particularly 10 to 90 nm, especially 10 to 40 nm, with an aspect ratio (diameter/thickness) of 2 to 7, particularly 2 to 5. The ferromagnetic hexagonal ferrite powder preferably has a coercive force (Hc) of 135 to 260 kA/m and a saturation magnetization ($\sigma$s) of 25 to 75 Am$^2$/kg, particularly 43 to 75 Am$^2$/kg. The ferromagnetic hexagonal ferrite powder preferably has a BET specific surface area of 30 to 70 m$^2$/g.

If desired, the ferromagnetic powder can contain rare earth elements or transition metal elements. The ferromagnetic powder can be subjected to a surface treatment to have improved dispersibility. Inorganic oxides which can be used for the surface treatment include $Al_2O_3$, $SiO_2$, $TiO_2$, $ZrO_2$, $SnO_2$, $Sb_2O_3$, and ZnO. These inorganic oxides can be used either individually or as a mixture of two or more thereof.

The binder to be used in the magnetic layer 4 can be selected from those useful for the formation of the backcoating layer 5. For the detail, the explanations given to the backcoating layer 5 can be referred to here. The binder is preferably used in an amount of 10 to 40 parts by weight, particularly 15 to 25 parts by weight per 100 parts by weight of the ferromagnetic powder.

The magnetic layer 4 can further contain abrasive, carbon black, lubricants, hardeners, etc. in addition to the ferromagnetic powder and binder.

Abrasives preferably include particulate materials having a Mohs hardness of 7 or higher such as alumina, silica, $ZrO_2$ and $Cr_2O_3$. From the standpoint of reduction in frictional coefficient and improvement in running durability, the abrasives preferably have a primary particle size of 0.03 to 0.6 μm, particularly 0.05 to 0.3 μm. The abrasives are preferably added in an amount of 2 to 20 parts by weight, particularly 5 to 15 parts by weight, per 100 parts by weight of the ferromagnetic powder.

The carbon black, lubricants and hardeners to be added to the magnetic layer 4 can be selected from those useful for the formation of the backcoating layer 5. For the detail, the explanations given to the backcoating layer 5 can apply appropriately. The carbon black is preferably used in an amount of 0.1 to 10 parts by weight, particularly 0.1 to 5 parts by weight per 100 parts by weight of the ferromagnetic powder. The lubricant is preferably used in an amount of 0.5 to 10 parts by weight, particularly 0.5 to 5 parts by weight on the same basis. The hardener is preferably used in an amount of 1 to 6 parts by weight, particularly 2 to 5 parts by weight on the same basis.

If desired, the magnetic layer 4 can further contain various additives customarily used in conventional magnetic tapes, such as dispersants, rust inhibitors, antifungal agents, and the like.

The magnetic layer 4 is formed by coating the intermediate layer 3 with a magnetic coating composition comprising the aforesaid components dispersed in a solvent. The solvent can be chosen from among those useful in the backcoating composition. The solvent is preferably used in an amount of 80 to 500 parts by weight, particularly 100 to 350 parts by weight, per 100 parts by weight of the ferromagnetic powder present in the magnetic coating composition.

The magnetic coating composition is prepared by, for example, preliminarily mixing the ferromagnetic powder and the binder together with a portion of the solvent in a Naughter mixer, etc., kneading the premixture in a continuous pressure kneader, a twin-screw extruder, etc., diluting the mixture with another portion of the solvent, followed by dispersing in a sand mill, etc., adding to the dispersion additives such as a lubricant, filtering the dispersion, and adding thereto the remainder of the solvent and a hardener.

In order to manifest sufficient recording and reproducing characteristics, the magnetic layer 4 preferably has a coercive force of 119 to 280 kA/m, particularly 120 to 250 kA/m, especially 125 to 222 kA/m. The magnetic layer 4 preferably has a saturation flux density of 0.1 to 0.5 T, particularly 0.15 to 0.5 T.

For obtaining an improved S/N ratio and for preventing self-demagnetization, the thickness of the magnetic layer 4 is preferably 0.1 to 3 μm, still preferably 0.1 to 2 μm.

The intermediate layer 3 may be either magnetic or non-magnetic. Where the intermediate layer 3 is magnetic, it contains magnetic powder, formed by using a magnetic coating composition mainly comprising magnetic powder, non-magnetic powder, a binder, and a solvent. Where the intermediate layer 3 is non-magnetic, it is formed by using a non-magnetic coating composition mainly comprising non-magnetic powder, a binder, and a solvent. The coating composition for the intermediate layer 3, either magnetic or non-magnetic, will be inclusively referred to as an intermediate layer coating composition.

The magnetic powder is preferably ferromagnetic powder. Both hard magnetic powder and soft magnetic powder are suitable. The hard magnetic powder includes the ferromagnetic hexagonal ferrite powder, ferromagnetic metal powder and ferromagnetic iron oxide powder which can be used in the magnetic layer 4. Ferromagnetic hexagonal ferrite powder is particularly preferred of them. For the details of these magnetic powders, the explanations given thereto with respect to the magnetic layer 4 can apply appropriately.

If desired, the ferromagnetic powder can contain rare earth elements or transition metal elements similarly to the ferromagnetic powder used in the magnetic layer 4. The ferromagnetic powder can be subjected to the same surface treatment as could be done for the ferromagnetic powder used in the magnetic layer 4.

The non-magnetic powder includes non-magnetic iron oxide (red oxide), barium sulfate, zinc sulfide, magnesium carbonate, calcium carbonate, calcium oxide, zinc oxide, magnesium oxide, magnesium dioxide, tungsten disulfide, molybdenum disulfide, boron nitride, tin dioxide, silicon carbide, cerium oxide, corundum, artificial diamond, garnet, siliceous stone, silicon nitride, molybdenum carbide, boron carbide, tungsten carbide, titanium carbide, diatomaceous earth, dolomite, and powder of resins. In particular, non-magnetic iron oxide (red oxide), titanium oxide, and boron nitride are preferred. These non-magnetic powders can be used either individually or as a combination of two or more thereof. The non-magnetic powder can have any of a spherical shape, a tabular shape and an acicular shape or may be amorphous. The spherical, tabular or amorphous powder preferably has a particle size of 5 to 200 nm, and the acicular powder preferably has a major axis length of 20 to 300 nm with an acicular ratio of 3 to 20. Where the non-magnetic powder is used in combination with the magnetic powder, namely, where the intermediate layer 3 is magnetic, it is preferably used in an amount of 30 to 70 parts by weight, particularly 40 to 60 parts by weight, per 100 parts by weight of the magnetic powder. Where the intermediate layer 3 is non-magnetic, containing no magnetic powder, the amounts of the other components are decided based on 100 parts by weight of the non-magnetic powder. The non-magnetic powder can be subjected to the same surface treatment as could be carried out on the magnetic powder.

The intermediate layer 3, either magnetic or non-magnetic, contains a binder and, if desired, abrasives, lubricants, carbon black, hardeners, and the like in addition to the above-mentioned components. These components are the same as described with reference to the backcoating layer 5 and magnetic layer 4. Preferred amounts of them are shown below, given in terms of parts by weight per 100 parts by weight of the total amount of the magnetic powder and the non-magnetic powder (where the intermediate layer 3 is magnetic) or 100 parts by weight of the non-magnetic powder (where the intermediate layer 3 is non-magnetic).

| | |
|---|---|
| Binder: | 16 to 40 parts, particularly 20 to 28 parts |
| Abrasive: | 6 to 30 parts, particularly 8 to 12 parts |
| Lubricant: | 2 to 20 parts, particularly 5 to 7 parts |
| Carbon black: | 5 to 30 parts, particularly 12 to 20 parts |
| Hardener: | 2 to 12 parts, particularly 4 to 8 parts |

If desired, the intermediate layer 3 can contain various additives as could be added to the magnetic layer 4.

The intermediate layer 3 is formed by coating the substrate 2 with the intermediate layer coating composition containing the aforesaid various components and a solvent. The solvent useful in the intermediate layer coating composition are the same as those used in the backcoating composition and the magnetic coating composition. The solvent is preferably used in an amount of 100 to 700 parts by weight, particularly 300 to 500 parts by weight, per 100 parts by weight of the total of the magnetic powder and the non-magnetic powder (where the intermediate layer 3 is magnetic) or the non-magnetic powder (where the intermediate layer 3 is non-magnetic).

The intermediate layer 3 should have such thickness as to assure the capacity of holding lubricants which is influential on the durability of the magnetic tape 1, but too large a thickness may be liable to crack initiation when deflected. A suitable thickness is 0.5 to 10 μm, particularly 0.1 to 3 μm.

Where the intermediate layer 3 is magnetic, its coercive force preferably ranges from 80 to 350 kA/m, particularly 150 to 300 kA/m, from the standpoint of overwrite characteristics and the output balance over a low to high frequency region. Its saturation flux density is preferably 0.02 to 0.1 T, particularly 0.03 to 0.09 T. Too high a saturation flux density may deteriorate the overwrite characteristics to unfavorably increase the noise. Too low a saturation flux density results in insufficient output.

The substrate 2 can be made of any conventional material known for magnetic tape. Polyethylene terephthalate, polyethylene naphthalate, and polyamide are preferred.

The magnetic tape 1 shown in FIG. 1 is preferably produced as follows. A magnetic coating composition for forming the magnetic layer 4 and an intermediate layer coating composition for forming the intermediate layer 3 are applied simultaneously onto the substrate 2 in a wet-on-wet coating system to form coating layers corresponding to the magnetic layer 4 and the intermediate layer 3. That is, the magnetic layer 4 is preferably provided while the intermediate layer 3 is wet.

The coated web thus obtained is subjected to magnetic field orientation, dried, and wound. Thereafter, the coated web is calendered, Further, a backcoating layer is formed. Alternatively, formation of the intermediate layer 3 and the magnetic layer 4 may be preceded by formation of the backcoating layer 5. The stock web thus obtained is aged at 40 to 80° C. for 6 to 100 hours and then slit to a prescribed width to obtain the magnetic tape 1. The grooves 10 are then formed on the backcoating layer 5 by the above-described method.

The above-mentioned simultaneous coating technique in a wet-on-wet coating system is described, e.g., in Japanese Patent Laid-Open No. 73883/93, column 42, line 31 to column 43, line 31. This is a technique in which the magnetic coating composition is applied before the intermediate layer coating composition dries. Where this technique is followed, there is obtained a magnetic tape which causes few dropouts and can cope with high-density recording, the coating layers of which have excellent durability.

The magnetic field orientation treatment is carried out before each coating composition dries. The treatment can be performed by applying a magnetic field of about 40 kA/m or higher, preferably about 80 to 800 kA/m, in parallel with the surface coated with the magnetic coating composition or passing the coated web through a solenoid type magnet of about 80 to 800 kA/m while the magnetic coating composition is wet. By this treatment under such conditions, the ferromagnetic powder in the magnetic layer 4 are orientated in the longitudinal direction of the tape 1. For the purpose of inhibiting the thus orientated ferromagnetic powder from changing its orientation during the subsequent drying step, it is a preferred manipulation to apply warm air at 30 to 50° C. from above the magnetic layer 4 immediately before the magnetic field orientation treatment, whereby the coated web is dried preliminarily to have a controlled residual solvent content in each layer.

The drying of the coating layers is carried out by, for example, supplying gas heated to 30 to 120° C. The degree of drying can be controlled by adjusting the temperature and the feed rate of the gas.

The calendering of the coated web is carried out by, for example, supercalendering comprising passing the coated web between two rollers, such as a combination of a metal roller and a cotton roller or a synthetic resin roller, or a pair of metal rollers. The calendering is preferably carried out, for example, at a temperature of 60 to 140° C. under a linear pressure of 100 to 500 kg/cm.

If desired, the surface of the magnetic layer 4 can be subjected to a finishing step, such as burnishing or cleaning. It is possible to apply the magnetic coating composition and the intermediate layer coating composition by a general successive coating technique.

While the magnetic tape of the present invention has been described by referring to its preferred embodiments, it should be understood that the present invention is not limited thereto, and various changes and modifications can be made therein without departing from the scope of the present invention.

For example, the servo tracking pattern in the foregoing embodiments can be a combination of one or more continuous grooves 10 extending in the longitudinal direction of the magnetic tape 1 and discontinuous grooves 10 extending along the longitudinal direction of the tape 1. In FIGS. 2 and 3(*a*) the spacing between adjacent grooves 10 may be regularly increased or decreased. While the section of the grooves 10 shown in FIG. 3(*a*) is almost rectangular, it can be U-shaped or V-shaped or may have other shapes. The recesses may be pits whose plane figure can be a circle, an oval or any other shape or an arbitrary combination thereof.

The magnetic tape 1 shown in FIG. 1 can have a primer layer located between the substrate 2 and the intermediate layer 3 or between the substrate 2 and the backcoating layer 5.

While the magnetic tape according to the above-described embodiments is of coated type, the advantageous effects of the present invention can be produced equally when the present invention is applied to a magnetic tape of metal-deposited type.

EXAMPLES

Having generally described the present invention, a further understanding can be obtained by reference to certain specific examples which are provided herein for purposes of illustration only and are not intended to be limiting unless otherwise specified. All the parts and percents are given by weight unless otherwise specified.

Example 1

The following components except the hardener were kneaded in a kneader, dispersed in a stirrer, and further finely dispersed in a sand mill. The dispersion was filtered through a 1 μm filer, and finally, the hardener was added thereto to prepare a backcoating composition, a magnetic coating composition, and an intermediate layer coating composition having the respective formulations described below.

| Formulation of Backcoating Composition | |
|---|---|
| Polyurethane resin (binder; "Nipporan 2301" (trade name) produced by Nippon Polyurethane Industry Co., Ltd.) | 50 parts |
| Nitrocellulose (binder; "Celnova BTH ½" (trade name) produced by Asahi Chemical Industry Co., Ltd.) | 30 parts |
| Carbon black (primary particle size: 18 nm) | 50 parts |
| Polyisocyanate (hardener; "D-250N" (trade name) produced by Takeda Chemical Industries, Ltd.) | 18 parts |
| Copper phthalocyanine | 5 parts |
| Stearic acid (lubricant) | 1 part |
| Methyl ethyl ketone (solvent) | 150 parts |
| Toluene (solvent) | 150 parts |
| Cyclohexanone (solvent) | 150 parts |
| Formulation of Magnetic Coating Composition: | |
| Ferromagnetic powder (acicular ferromagnetic metal powder comprising iron as major component; major axis length: 80 nm; coercive force: 183 kA/m; saturation magnetization: 145 Am$^2$/g; BET specific surface area: 55 m$^2$/g) | 100 parts |
| Vinyl chloride copolymer (binder; "MR104" (trade name) produced by Nippon Zeon Co., Ltd.) | 10 parts |
| Polyurethane resin (binder; "UR 8300" (trade name) produced by Toyobo Co., Ltd.) | 10 parts |
| Carbon black (primary particle size: 30 nm) | 0.5 part |
| α-Alumina (abrasive; primary particle size: 200 nm) | 10 parts |
| Myristic acid (lubricant) | 2 parts |
| Butyl stearate (lubricant) | 0.5 part |
| Isocyanate compound (hardener; "Coronate L" (trade name), produced by Nippon Polyurethane Industry Co., Ltd.) | 2 parts |
| Methyl ethyl ketone (solvent) | 250 parts |
| Cyclohexanone (solvent) | 100 parts |
| Formulation of Intermediate Layer Coating Composition: | |
| Acicular α-Fe$_2$O$_3$ (major axis length: 0.15 μm; acicular ratio: 7) | 100 parts |
| Vinyl chloride copolymer (binder; "MR104" (trade name) produced by Nippon Zeon Co., Ltd.) | 10 parts |
| Polyurethane resin (binder; "UR 8300" (trade name) produced by Toyobo Co., Ltd.) | 15 parts |
| α-Alumina (abrasive; primary particle size: 200 nm) | 3 parts |
| Carbon black (primary particle size: 20 nm) | 20 parts |
| Myristic acid (lubricant) | 2 parts |
| Butyl stearate (lubricant) | 2 parts |
| Isocyanate compound (hardener; "Coronate L" (trade name), produced by Nippon Polyurethane Industry Co., Ltd.) | 5 parts |
| Methyl ethyl ketone (solvent) | 150 parts |
| Cyclohexanone (solvent) | 50 parts |

The intermediate layer coating composition and the magnetic coating composition were applied simultaneously onto a 6 μm thick polyethylene terephthalate film by means of a die coater to form the respective coating layers having a dry thickness of 1.5 μm and 0.2 μm, respectively. The coated web was passed through a solenoid type magnet of 400 kA/m while wet, and dried in a drying oven by applying hot air at 80° C. at a rate of 10 m/min. The coated web was then calendered to form an intermediate layer and a magnetic layer. The reverse side of the substrate was coated with the backcoating composition and dried at 90° C. to form a backcoating layer having a thickness of 0.5 μm. The coated web was slit into strips of 12.7 mm in width to obtain a magnetic tape.

A plurality of grooves were formed on the backcoating layer of the resulting magnetic tape at a pitch of 15 μm by laser-beam machining as shown in FIG. 5. A laser diode having a wavelength of 780 μm was used under conditions of 0.025 W in average output power per beam and 4 μm in beam diameter. During the laser-beam machining, the magnetic tape was run at a speed of 5 m/s with its lower edge regulated so that the distance from that edge to each groove be constant. The grooves thus formed were straight and continuous and equally spaced in parallel to the longitudinal direction of the magnetic tape.

Example 2

A magnetic tape was obtained in the same manner as in Example 1, except that laser-beam machining was carried out by using the second harmonic waves of an Nd:YAG laser having a wavelength of 532 nm under conditions of 0.3 W in average output power per beam, 100 ns in laser pulse length, and 6 μm in beam diameter.

Example 3

A magnetic tape was obtained in the same manner as in Example 1, except that laser-beam machining was carried out by using an Nd:YAG laser having a wavelength of 1.06 μm under conditions of 0.5 W in average output power per beam, 100 ns in laser pulse length, and 18 μm in beam diameter.

Example 4

A magnetic tape was obtained in the same manner as in Example 1, except that laser-beam machining was carried out under conditions of 40 mW in average output power per beam and that the magnetic tape was run at a speed of 0.5 m/sec.

Comparative Example 1

A magnetic tape was obtained in the same manner as in Example 1, except for replacing the carbon black used in the backcoating composition with carbon black having a primary particle size of 100 nm.

Comparative Example 2

A magnetic tape was obtained in the same manner as in Example 1, except for replacing the carbon black used in the backcoating composition with carbon black having a primary particle size of 12 nm.

The depth d, width w and pitch p of the grooves in the magnetic tapes prepared in Examples and Comparative Examples were measured from their electron micrographs taken of the cross section of the backcoating layer. The results are as shown in Table 1 below. The arithmetic mean roughness Ra of the backcoating layer is also shown in Table 1. Further, the maximum height Rp of the projections on the longitudinal lips of the grooves, as measured with an AFM, is also shown in Table 1.

In measuring the reproduction output of the magnetic tape, as will be referred to hereunder, output signals having a reproduction bit area of 0.2 μm×12 μm were measured on a modified DLT-7000 drive equipped with a fixed head, and the results were expressed relatively taking the magnetic tape of Example 1 as a standard. The dropouts were measured by recording 1 Mbits of signals having a reproduction bit area of 0.2 μm×12 μm and counting the number of bits at which the reproduction output reduced by half or more.

The performance of the magnetic tapes obtained in Examples and Comparative Examples was evaluated as follows. Signals were recorded on the magnetic tape while conducting servo tracking by a push-pull method. As a result, reliable servo tracking was achieved on the magnetic tapes of Examples 1, 2 and 4 even in recording at a data track density of 300 tpmm (tracks/mm) or higher as shown in Table 1. No damage was observed on these magnetic tapes, which might have been caused by tape deformation such as twisting due to groove formation on the backcoating layer. Each magnetic tape was wound around a reel at a tension of 140 gf and stored at room temperature for 3 months. The depth of the depressions formed on the surface of the magnetic layer due to contact with the grooved backcoating layer was measured with an AFM in the same manner as described above. The results obtained are shown in Table 1.

It is seen that the magnetic tapes of Examples 1 to 3 which have a small Rp value on both lips of the grooves undergo little transfer of the surface profile of the backcoating layer and show no increase in dropout. While not shown in Table 1, it was also proved that the magnetic tapes of Examples 1 to 3 retain the level of reproduction output of ordinary magnetic tapes. The magnetic tape of Example 4 achieved servo tracking with certainty at a track density of 300 tpmm or higher immediately after the preparation. After the storage, servo tracking was made stably at a track density of 100 tpmm or higher, but, at a track density of 300 tpmm or higher reading became instable and an increase in dropout was observed.

TABLE 1

| | Grooves of Backcoating Layer | | | | | Evaluation | | |
| --- | --- | --- | --- | --- | --- | --- | --- | --- |
| | | | | | Rp of Both | Servo | Magnetic Layer | | |
| | Depth d (μm) | Width w (μm) | Pitch p (μm) | Ra (nm) | Lips of Grooves (μm) | Tracking just after Preparation | Depth of Depressions after 3-Month Storage under Wound State (nm) | Dropout after 3-Month Storage under Wound State | Servo Tracking after 3-Month Storage under Wound State |
| EX. 1 | 0.15 | 3 | 15 | 8 | 0.05 | A | 8 | not observed | A |
| EX. 2 | 0.20 | 5 | 15 | 8 | 0.01 | A | no transfer | not observed | A |
| EX. 3 | 0.35 | 20 | 100 | 8 | 0.10 | C | 20 | not observed | C |
| EX. 4 | 0.30 | 4 | 15 | 8 | 0.50 | A | 100 | observed | B |
| Comp. Ex. 1 | 0.15 | 3 | 15 | 25 | 0.05 | C | 8 | observed | D |
| Comp. Ex. 2 | 0.15 | 3 | 15 | 3 | 0.05 | A | unmeasurable* | unmeasurable* | D |

*Sticking of the magnetic layer to the backcoating layer occurred.
A — Servo tracking possible at a track density of 300 tpmm or more.
B — Servo tracking ppssible at a track density of 100 tpmm or more and less than 300 tpmm.
C — Servo tracking possible at a track density of 50 tpmm or more and less than 100 tpmm.
D — Servo tracking impossible.

Obviously, numerous modifications and variations of the present invention are possible in light of the above teachings. It is therefore to be understood that within the scope of the appended claims, the invention may be practiced otherwise than as specifically described herein.

This application claims the priority of Japanese Patent Application No. 9-290166 filed Oct. 22, 1997 which is incorporated herein by reference.

What is claimed is:

1. A magnetic tape comprising a substrate having a magnetic layer on one side thereof and a backcoating layer on the other side, wherein the backcoating layer has on the surface thereof a recess of prescribed shape capable of yielding an optical contrast to provide optical information with which servo tracking of the data track on the magnetic layer is effected, the recess has a depth of 0.05 to 1 μm and a width of 0.25 to 30 μm, and the backcoating layer has an arithmetic mean roughness Ra of 4 to 20 nm.

2. The magnetic tape according to claim 1, wherein the maximum height of projections formed on both lips of the recess in the longitudinal direction of the recess is 0.25 μm or lower.

3. The magnetic tape according to claim 1, wherein said recess comprises one or more continuous grooves along the longitudinal direction of the tape.

4. The magnetic tape according to claim 1, wherein said recess comprises discontinuous grooves along the longitudinal direction of the tape.

5. The magnetic tape according to claim 1, wherein said servo tracking is carried out by detecting light having entered said recess and reflected.

6. The magnetic tape according to claim 1, wherein said recess is formed by laser-beam machining.

7. The magnetic tape according to claim 1, wherein said tape has a magnetic or nonmagnetic intermediate layer between said substrate and said magnetic layer, and said magnetic layer contains acicular or spindle-shaped ferromagnetic metal powder having a major axis length of 0.05 to 0.2 $\mu$m or tabular ferromagnetic hexagonal ferrite powder having a tabular diameter of 0.1 $\mu$m or smaller.

* * * * *